(12) United States Patent
Yoshimura (10) Patent No.: US 8,308,464 B2
(45) Date of Patent: Nov. 13, 2012

(54) BEARING AND LIQUID COOLING TYPE SCREW COMPRESSOR

(75) Inventor: Shoji Yoshimura, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 677 days.

(21) Appl. No.: 11/936,878

(22) Filed: Nov. 8, 2007

(65) Prior Publication Data

US 2008/0152529 A1    Jun. 26, 2008

(30) Foreign Application Priority Data

Dec. 22, 2006    (JP) .................................. 2006-345441

(51) Int. Cl.
*F01C 1/16* (2006.01)
*F01C 1/24* (2006.01)
*F04C 2/16* (2006.01)
*F04C 2/24* (2006.01)
*F16C 32/06* (2006.01)

(52) U.S. Cl. ......... 418/201.1; 418/73; 418/76; 384/100; 384/118

(58) Field of Classification Search .............. 418/71–82, 418/201.1; 384/100, 114, 118
See application file for complete search history.

(56) References Cited

U.S. PATENT DOCUMENTS

| | | | |
|---|---|---|---|
| 3,388,854 A | | 6/1968 | Olofsson et al. |
| 3,453,031 A | * | 7/1969 | Bjork et al. ................... 384/118 |
| 3,814,554 A | * | 6/1974 | Jansson et al. .................. 418/73 |
| 3,887,310 A | * | 6/1975 | Gerber ............................ 418/72 |
| 3,961,870 A | * | 6/1976 | Vlemmings ..................... 418/73 |
| 4,307,918 A | * | 12/1981 | Mohsin .......................... 384/100 |
| 4,909,714 A | * | 3/1990 | Cheng .............................. 418/73 |
| 4,930,907 A | * | 6/1990 | Smith ............................ 384/118 |
| 4,989,997 A | | 2/1991 | Yoshimura |
| 5,028,221 A | * | 7/1991 | Malfit ............................. 418/72 |
| 5,662,463 A | * | 9/1997 | Mirzoev et al. ................. 418/73 |
| 5,743,654 A | * | 4/1998 | Ide et al. ....................... 384/100 |
| 6,059,551 A | | 5/2000 | Amano et al. |
| 6,302,667 B1 | * | 10/2001 | Timuska et al. ........... 418/201.1 |
| 6,312,239 B1 | * | 11/2001 | Kirsten ........................... 418/76 |

FOREIGN PATENT DOCUMENTS

| | | |
|---|---|---|
| CN | 86 1 01841 A | 10/1986 |
| CN | 86 2 04876 U | 6/1987 |
| CN | 1165554 A | 11/1997 |
| CN | 1346943 A | 5/2002 |
| JP | 48-33041 | 10/1973 |
| JP | 57-153986 | 9/1982 |
| JP | 60-245825 | 12/1985 |
| JP | 63-235723 | 9/1988 |
| JP | 2-76923 | 3/1990 |
| JP | 3-61714 | 3/1991 |
| JP | 4-64714 | 2/1992 |
| JP | 5-296247 | 11/1993 |
| JP | 10-122168 | 5/1998 |
| JP | 2001-140888 A | 5/2001 |
| JP | 2004-98719 | 4/2004 |
| SU | 842263 | 6/1981 |

\* cited by examiner

*Primary Examiner* — Mary A Davis
(74) *Attorney, Agent, or Firm* — Oblon, Spivak, McClelland, Maier & Neustadt, L.L.P.

(57) ABSTRACT

A groove is provided in the periphery of a pressure receiving area of a pressure receiving surface opposing to the load of axis weight within a bearing surface supporting an axis, and a liquid supply route communicating with the groove is provided so that liquid is supplied to the groove through the liquid supply route. In such a configuration, a bearing having a simple structure and a high compact load capacity and a liquid cooling type screw compressor using the above bearing are provided.

5 Claims, 7 Drawing Sheets

PRESSURE RECEIVING SURFACE 103

FIG.10 a bearing according to the present invention. Within a casing

BEARING AND LIQUID COOLING TYPE SCREW COMPRESSOR

BACKGROUND OF THE INVENTION

1. Field of the Invention

The present invention relates to a bearing and a liquid cooling type screw compressor using the bearing.

2. Description of the Related Art

In the screw compressor, a thrust load and a radial load are imposed on a rotor axis by gas compressed by a pair of male and female screw rotors meshing with each other. Therefore, the rotor axis is supported by a thrust bearing and a radial bearing. In order to reduce the load imposed on the above bearings so as to extend the life of the bearings, an apparatus for reducing the thrust load is proposed in Japanese Patent Publication No. Sho48-33041 and Japanese Patent Laid-Open No. Sho57-153986, and an apparatus for reducing the radial load is proposed in Japanese Patent Laid-Open No. Hei3-61714.

The screw compressor disclosed in Japanese Patent Laid-Open No. Hei3-61714 is configured such that a high pressure fluid chamber is provided on the side of the imposing direction of the radial load and a constant pressure fluid chamber is provided on the other side. In the case of the above screw chamber, width of bearings is large and hence the compressor has to be large.

Figure 9:
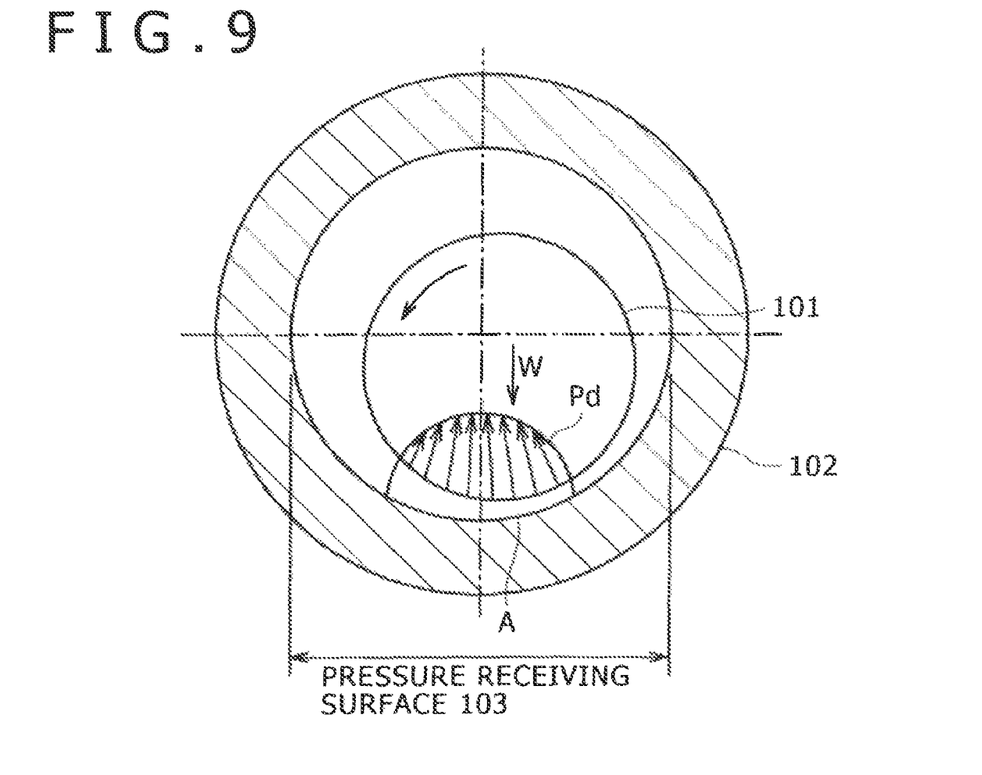
FIG. 9 is a schematic sectional view showing the bearing of the conventional oil cooling type screw compressor.
Figure 10:
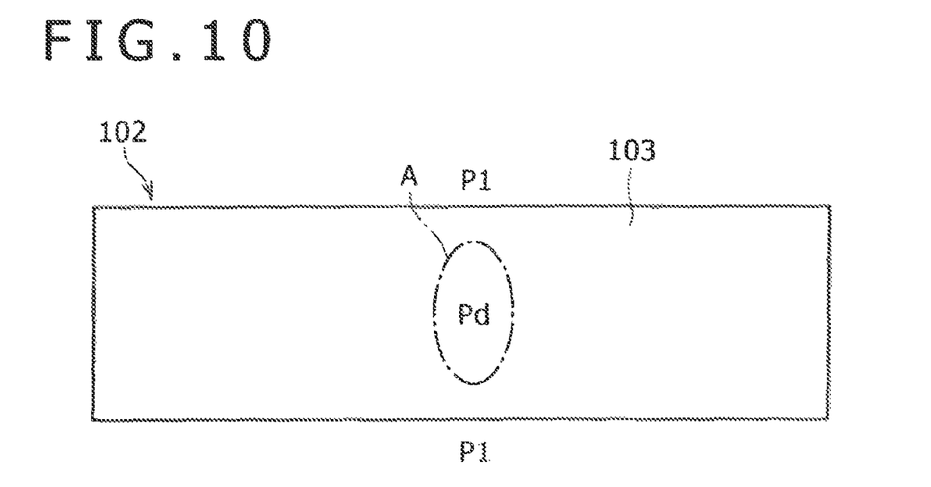
FIG. 10 is a development view of a bearing surface of the bearing in FIG. 9.

In FIG. 9, provided that a load of axis weight W, the radial load, is imposed on an axis 101 from the top towards the bottom, a gap between a pressure receiving surface 103 of a bearing 102 and the axis 101 is partly narrowed, and oil is caught into the narrowed pressure receiving area A so that hydraulic pressure (dynamic pressure) Pd is generated as shown in FIG. 10. The above hydraulic pressure Pd is determined by oil viscosity, gap, rotation speed or the like and also determined by peripheral pressure P1. The peripheral pressure P1 is pressure of an end surface of the bearing 102. The more the hydraulic pressure is, the higher a load capacity of the bearing 102 is. However, the hydraulic pressure generated in the gap between the pressure receiving surface 103 of the bearing 102 and the axis 101 is higher than the periphery pressure P1 of the bearing 102. Therefore, as a result of leaking from the bearing gap to the end surface of the bearing, the load capacity is decreased.

SUMMARY OF THE INVENTION

It is an object of the present invention to provide a bearing having a simple structure and a high compact load capacity and a liquid cooling type screw compressor using the above bearing.

In order to achieve the above object, in the bearing according to the present invention, a groove is provided in the periphery of a pressure receiving area of a pressure receiving surface opposing to a load of axis weight within a bearing surface supporting an axis, and a liquid supply route communicating with the groove is provided, so that liquid is supplied to the groove through the liquid supply route.

The above groove preferably comprises two grooves in the circumferential direction and two grooves in the axial direction.

In this case, the above grooves in the circumferential direction and the above grooves in the axial direction preferably are continuous to each other.

The above grooves in the axial direction may be not continuous in the middle.

The liquid cooling type screw compressor mentioned above according to the present invention comprises pair of male and female screw rotors meshing with each other, a compressor main body housing the screw rotors taking the bearing according to the above configuration of the present invention as a bearing, and a liquid separator for separating liquid from gas discharged from the compressor main body, wherein the liquid separated in the liquid separator is supplied to the liquid supply route of the bearing.

In the liquid cooling type screw compressor of the above configuration, a liquid pump is preferably provided in a liquid supply line for supplying the liquid separated in the liquid separator to the liquid supply route of the bearing so as to increase fluid pressure.

According to the bearing and the liquid cooling type screw compressor of the present invention, the groove is provided in the periphery of the pressure receiving area of the pressure receiving surface opposing to the load of axis weight within the bearing surface supporting the axis and the liquid supply route communicating with the groove is provided so as to supply the liquid to the groove through the liquid supply route. Therefore, pressure on the pressure receiving surface of the bearing is high, and even if hydraulic pressure generated in a gap between the bearing and the axis is leaked to the periphery thereof, the load capacity is not decreased.

Since the groove is only provided in the periphery of the pressure receiving area of the pressure receiving surface opposing to the load of axis weight within the bearing surface supporting the axis, size of the bearing is not increased and compact.

DESCRIPTION OF THE PREFERRED EMBODIMENTS

Hereinafter, an embodiment of the present invention will be described with reference to the attached drawings.

Figure 1:
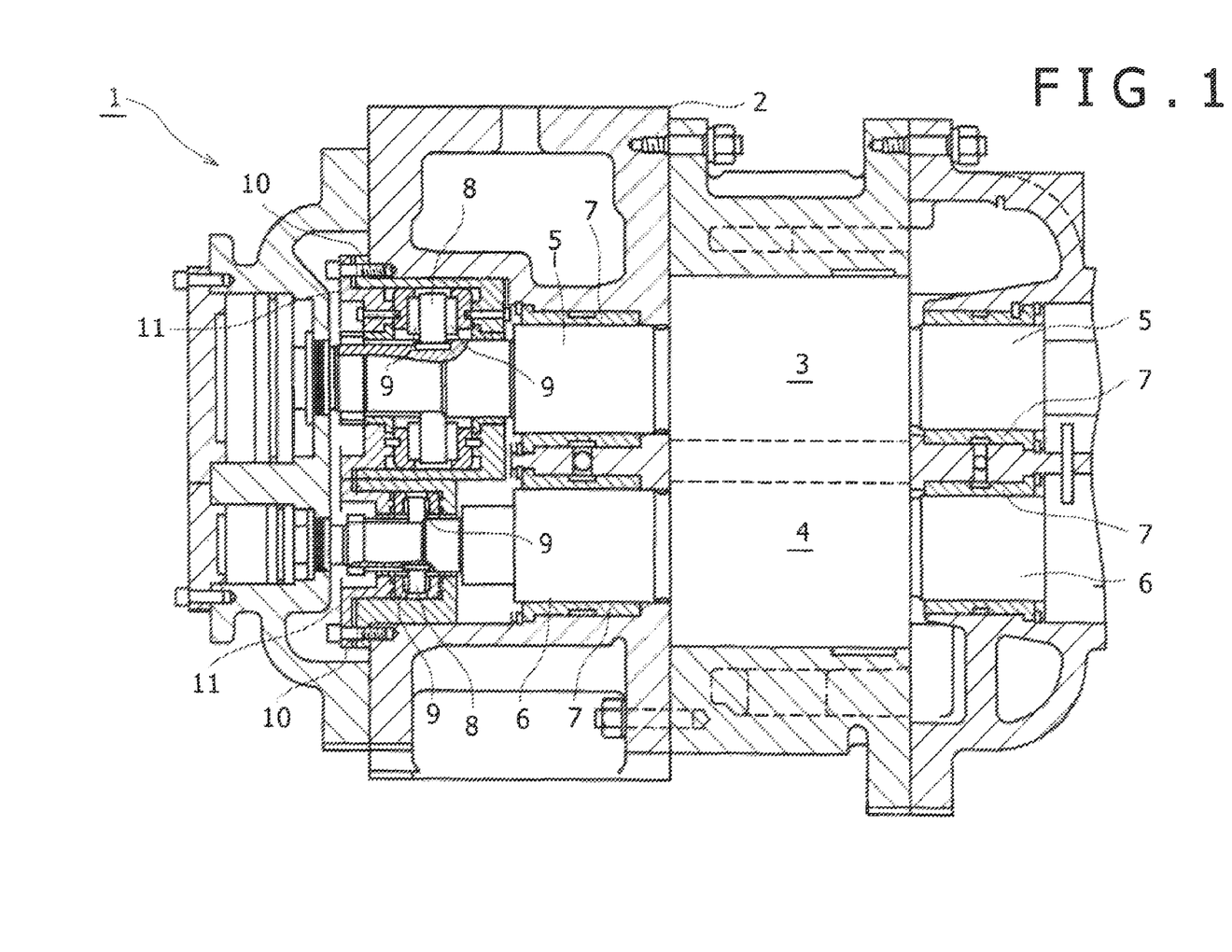
FIG. 1 is a sectional view showing an internal structure of an oil cooling type screw compressor in which a bearing of the present invention is used.

FIG. 1 shows an oil cooling type screw compressor 1 using a bearing according to the present invention. Within a casing 2 of the above oil cooling type screw compressor 1, are housed a pair of male and female screw rotors 3 and 4 meshing with each other. Rotor axes 5 and 6 on both ends of the screw rotors 3 and 4 respectively are supported by radial bearings 7 according to the present invention described later. On the outside of the radial bearings 7 on the left side in FIG. 1, thrust bearings 9 supporting disk-shaped thrust members 8 which is fitted to the rotor axes 5 and 6 from the both sides are provided through bearing holding members 10 and 11. The rotor axis 5 on the right side in FIG. 1 of the screw rotor 3 is rotationally driven by a motor (not shown). Following the above rotation of the screw rotor 3, the other screw rotor 4 is rotated.

Figure 2:
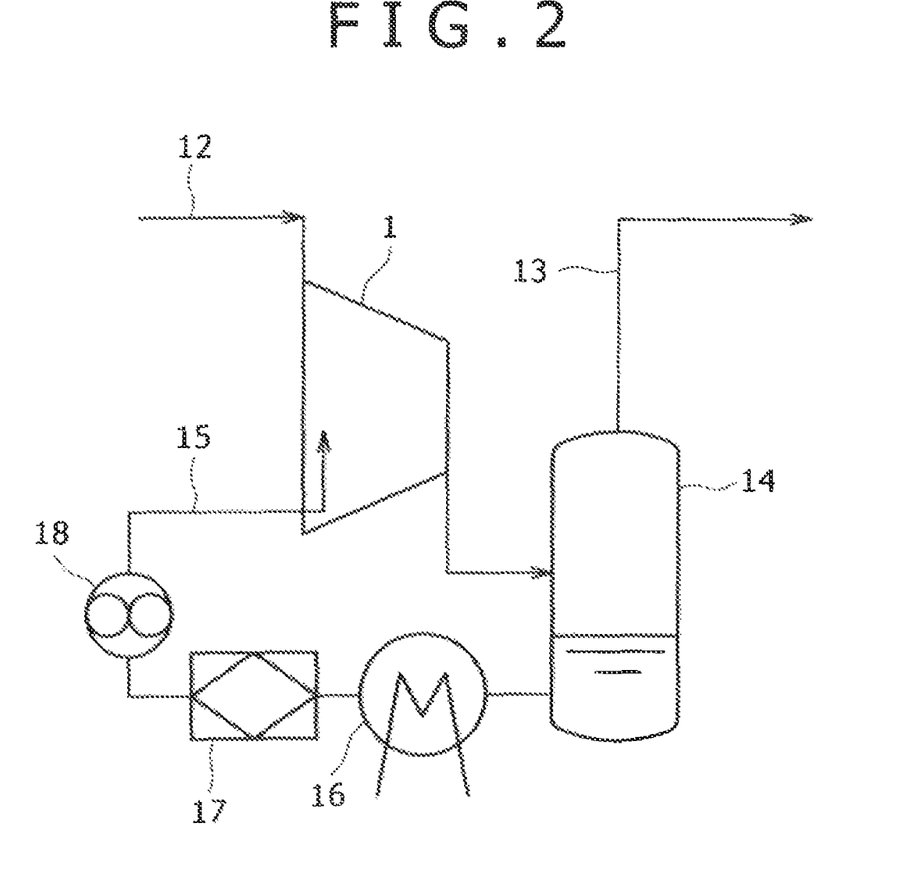
FIG. 2 is a system diagram showing a connection line of the oil cooling type screw compressor in FIG. 1.

As shown in FIG. 2, gas supplied through a suction line 12 is compressed in the oil cooling type screw compressor 1 and discharged to a discharge line 13. An oil separator 14 is provided in the discharge gas line 13. Gas from which oil is separated in the oil separator 14 is supplied to a demanding unit (not shown). The oil separated in the oil separator 14 is returned to the bearings and rotor meshing grooves of the oil cooling type screw compressor 1 through an oil supply line 15. In the oil supply line 15, are provided an oil cooler 16, a filter 17 and an oil pump 18.

Figure 3:
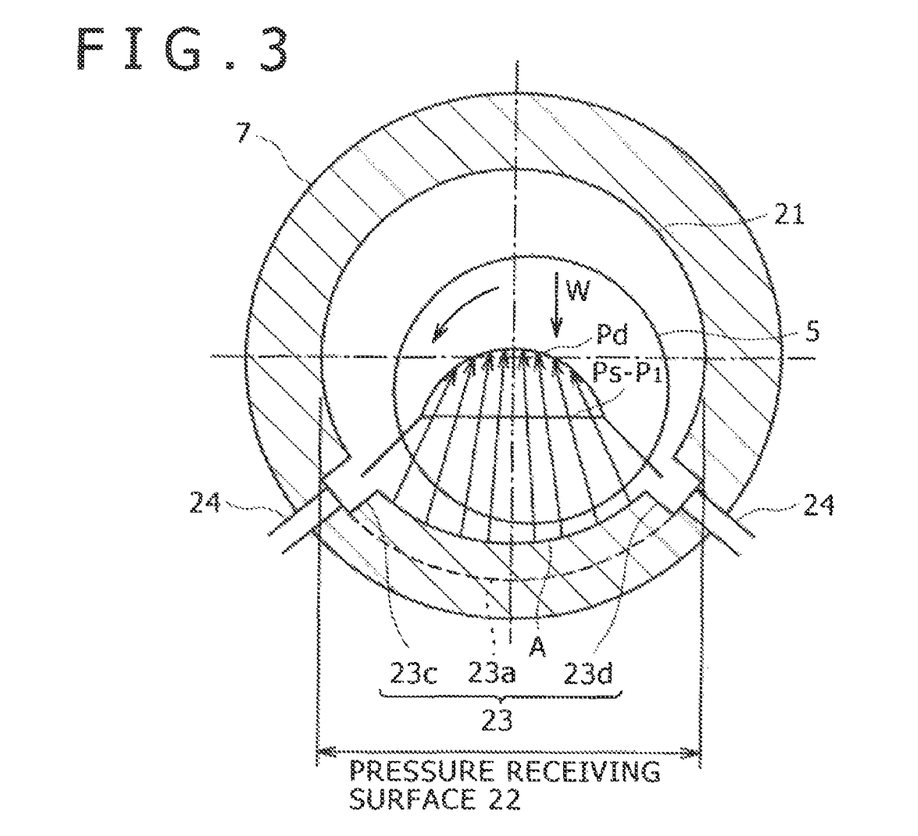
FIG. 3 is a schematic sectional view showing the bearing of the oil cooling type screw compressor in FIG. 1.
Figure 4:
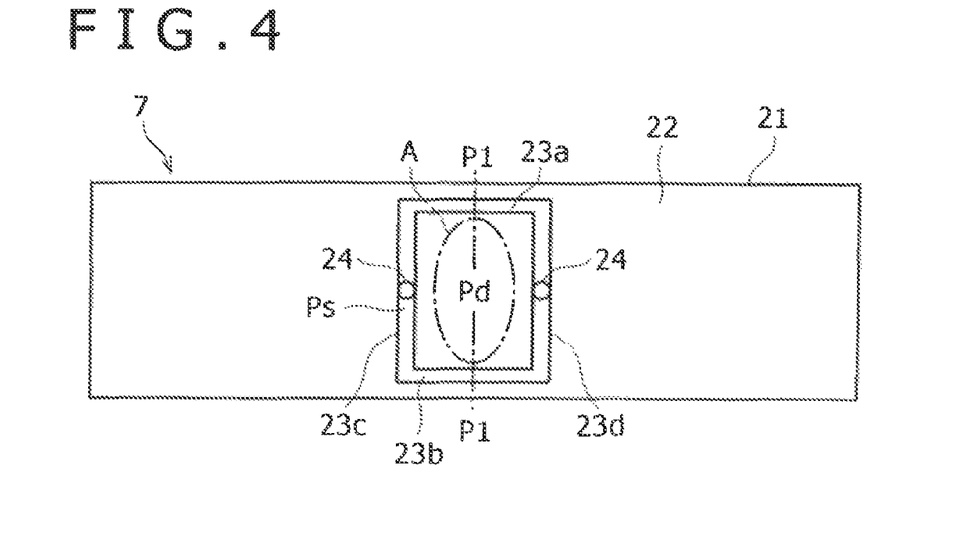
FIG. 4 is a development view of a bearing surface of the bearing in FIG. 3.

FIG. 3 is a conceptual view of the radial bearing 7 supporting the rotor axis 5 of the oil cooling type screw compressor 1, and FIG. 4 is a development view of a bearing surface 21 thereof. Other radial bearings 7 have the same configuration as shown in FIGS. 3 and 4, and hence an explanation thereof will be omitted. In the radial bearing 7, a groove 23 is formed on a pressure receiving surface 22 opposing to the load of axis weight W within the bearing surface 21 supporting the rotor axis 5. More specifically, the groove 23 is formed in the periphery of a pressure receiving area A which has the smallest gap from the rotor axis 5 and on which dynamic pressure Pd is imposed. The groove 23 is, as shown in FIG. 4, formed by two grooves in the circumferential direction 23a and 23b and two grooves in the axial direction 23c and 23d. The above grooves 23a to 23d are continuous to each other so as to close in the periphery of the pressure receiving area A. An oil supply route 24 communicating with the groove 23 is provided passing through the radial bearing 7. The oil supply route 24 is provided in any part of the groove 23, but preferably provided in a center of the two grooves in the axial direction 23c and 23d as shown in FIG. 4. The oil supply route 24 is connected to the oil supply line 15 shown in FIG. 2, and high pressure oil pressurized by the oil pump 18 is supplied.

In general, operation conditions such as axial rotation speed required for a compressor, suction pressure of compressor and discharge pressure are limited within a certain range. The pressure receiving area A in accordance with the above operation conditions is determined as a substantially fixed area.

Next, a description will be given to an effect of the radial bearing 7 of the oil cooling type screw compressor 1. When the high pressure oil is supplied from the oil supply line 15 to the groove 23 of the radial bearing 7 through the oil supply route 24, pressure Ps which is higher than that in the pressure receiving area A is imposed on the groove 23. That is, an amount of oil which is leaked from the pressure receiving area A to the periphery is supplemented and supplied to the groove 23. Therefore, the pressure within the pressure receiving area A becomes high, and a load capacity of the radial bearing 7 is improved. The pressure within the pressure receiving area A is, as shown in FIG. 3, pressure obtained by increasing the dynamic pressure Pd on the pressure receiving area A by differential pressure Ps-P1 between the pressure Ps of the oil supplied to the groove 23 and peripheral pressure P1. The pressure Ps of the oil within the groove 23 is the same as discharge pressure P2 of the gas within the oil separator 14. The peripheral pressure P1 of the radial bearing 7 is substantially equal to suction pressure of the gas. For example, in the case where the discharge pressure P2 is 0.7 MPa, the load capacity of the radial bearing 7 is approximately 1.5 times more than the conventional bearing.

In the screw compressor 1, the load of axis weight W is always imposed in the same direction. Therefore, when the groove 23 is provided rightly surrounding the pressure receiving area A, it is possible to maintain the load capacity under any operation conditions.

A description will further be given to a meaning of providing the groove 23. The pressure within the pressure receiving area A is determined by adding the pressure in the periphery of the pressure receiving area A with dynamic pressure due to a "wedge effect" determined by the operation conditions such as the rotation speed. The present invention is to increase the pressure in the periphery of the pressure receiving area A and hence increase the pressure within the pressure receiving area A. In order to surely increase the pressure in the periphery of the pressure receiving area A, the groove 23 is required. In the case where only the oil supply route 24 is provided without the groove 23, pressure in a narrow area in the periphery of the pressure receiving area A is only increased, and it is not possible to increase the pressure in the periphery of the pressure receiving area A.

In the above embodiment, the oil pump 18 is provided in the oil supply line 15. Therefore, in comparison to the case where the oil pump is not provided, the pressure 1s of the oil supplied to the groove 23 of the radial bearing 7 is increased, and further it is possible to increase the load capacity.

Figure 5:
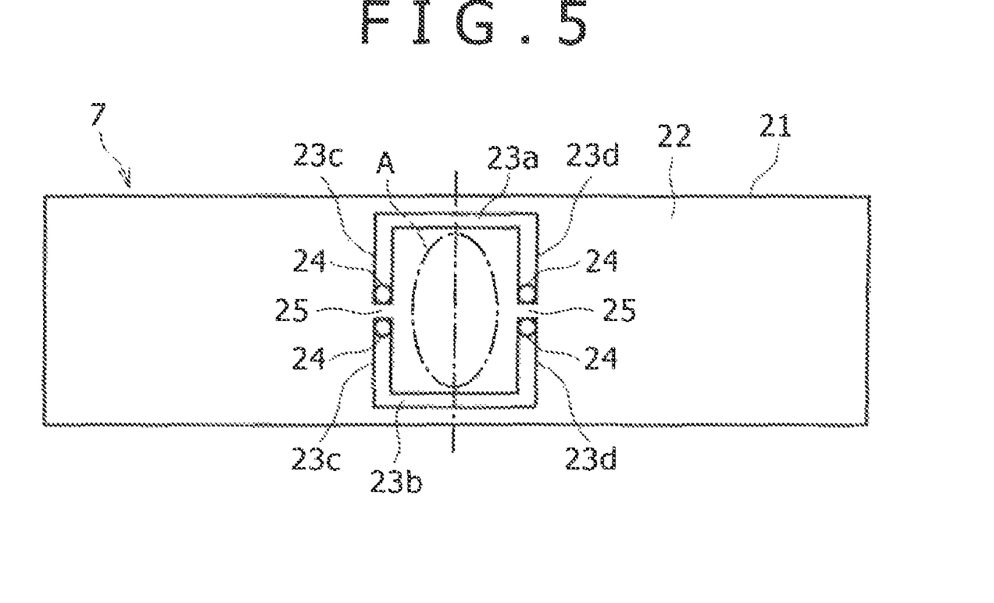
FIG. 5 is a sectional view of a modified example of the bearing surface of the bearing in FIG. 3.

In the above embodiment, although the groove 23 is continuous, there is a fear that strength of the radial bearing 7 is deceased due to existence of the grooves in the axial direction 23c and 23d and hence the radial bearing 7 is deformed. Therefore, as shown in FIG. 5, a non-continuous portion 25 may be provided in the middle of the grooves in the axial direction 23c and 23d so as to maintain the strength. When such a non-continuous portion 25 is short, oil leakage is little and the load capacity is not influenced. It should be noted that the "middle of the grooves in the axial direction 23c and 23d" here is not always limited to the center middle of the grooves in the axial direction 23c and 23d.

Figure 6:
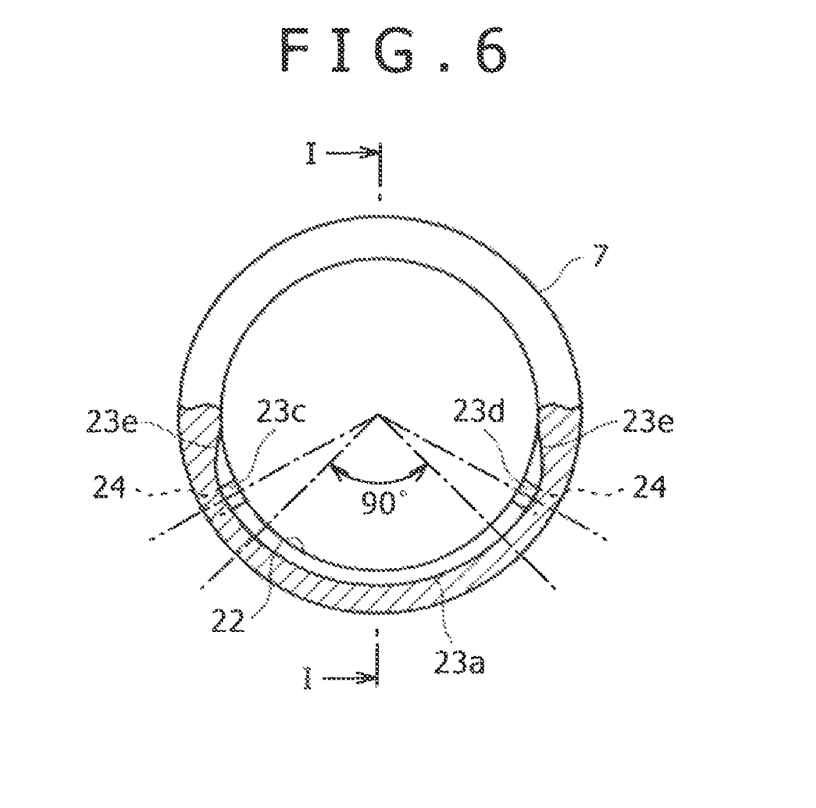
FIG. 6 is a front view showing an embodiment of the bearing according to the present invention.
Figure 7A:
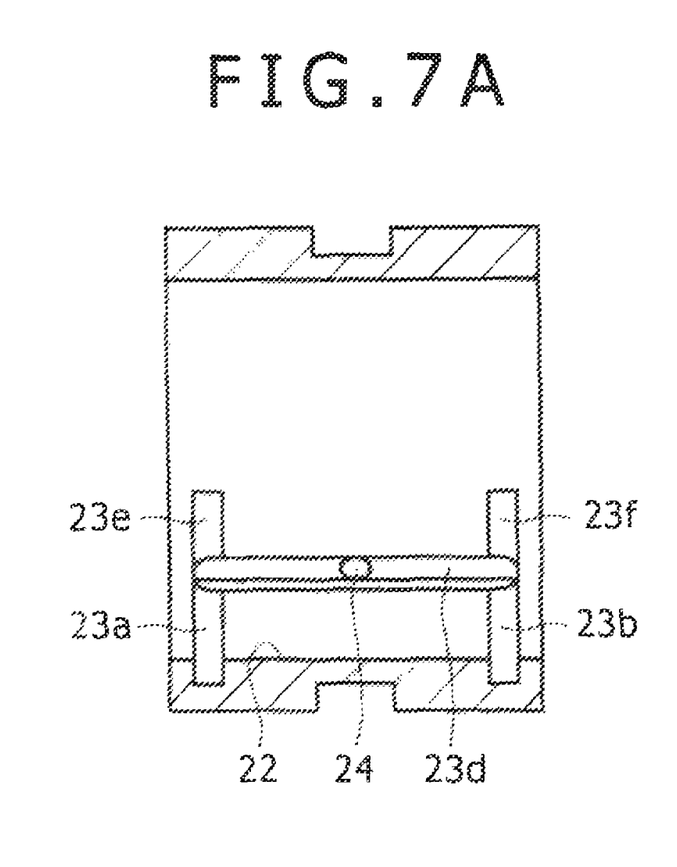
FIG. 7A is a sectional view by line I-I of the bearing in FIG. 6
Figure 7B:
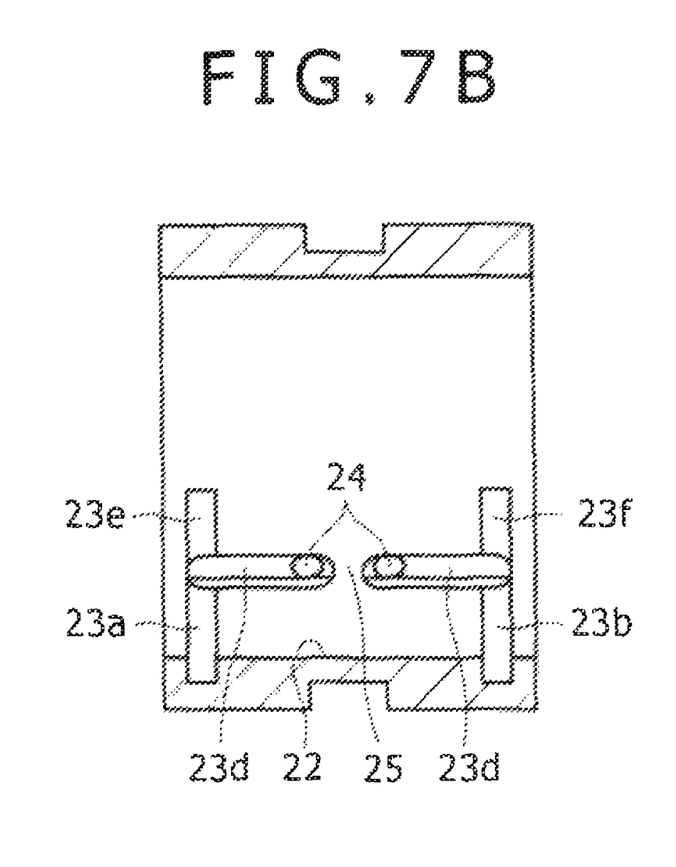
FIG. 7B is a sectional view of a modified example thereof.

FIGS. 6 and 7A show an embodiment of the groove 23 of the radial bearing 7. In the above radial bearing 7, the grooves in the circumferential direction 23a and 23b with fixed depth are provided over a range of approximately 90 degrees of the pressure receiving surface 22 in the vicinity of both ends of the radial bearing 7, and transition grooves 23e and 23f with gradually decreasing depth are formed over an area from both ends of the grooves in the circumferential direction 23a and 23b to the pressure receiving surface 22. The grooves in the axial direction 23c and 23d are provided between the transition grooves 23e and 23f and the grooves in the circumferential direction 23a and 23b. The oil supply route 24 is formed in the grooves in the axial direction 23c and 23d. It is preferable that the grooves in the circumferential direction 23a and 23b have 5 to 10 mm in width and 5 to 10 mm in depth and the grooves in the axial direction 23c and 23d also have 5 to 10 mm in width and 5 to 10 mm in depth. FIG. 7B is the same as FIG. 7A except for providing the non-continuous portion 25 in the middle of the grooves in the axial direction 23c and 23d. Width of the non-continuous portion 25 is preferably twice to four times more than width of the grooves.

Figure 8A:
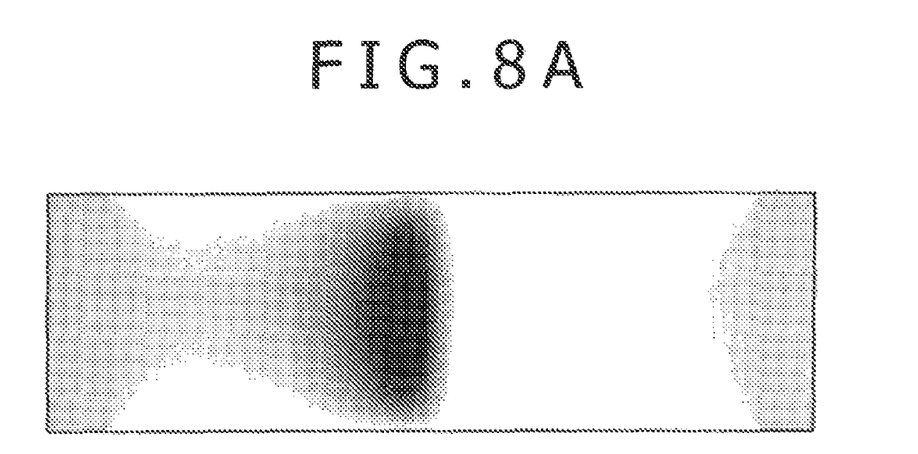
FIG. 8A shows a calculation result of pressure on a pressure receiving surface of the conventional bearing and FIG. 8B shows a calculation result of pressure on the pressure receiving surface of the bearing according to the present invention.
Figure 8B:
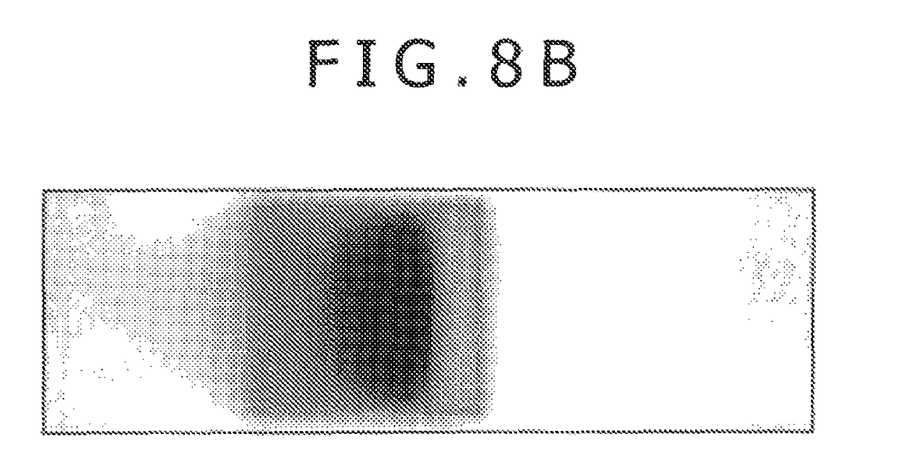

In FIGS. 8A and 8B, pressure at each point of the pressure receiving surface is determined by calculation and displayed by grey scale, when the radial bearing with the grooves according to the present invention and the conventional radial bearing without the grooves are respectively rotated while supporting the rotor axis under the following conditions. It should be noted that to the radial bearing with the grooves according to the present invention, water pressure is imposed on the grooves of the radial bearing.

<Common Conditions>

Diameter of rotor axis: 70 mm
Inner diameter of bearing: 70.15 mm
Length ratio of bearing to inner diameter: 1
Rotation speed of rotor axis: 2231 rpm <Conditions for Radial Bearing with Grooves According to the Present Invention>

Angle from vertical axis to grooves in the axial direction in the rotational direction: 25°
Angle from vertical axis to grooves in the axial direction in the counter-rotational direction: 80°
Gap between grooves in the circumferential direction: 50 mm
Distance from end surface of bearing to edges of grooves in the circumferential direction: 5 mm
Grooves in the circumferential direction: 5 mm in width and 5 mm in depth
Grooves in the axial direction: 5 mm in width and 5 mm in depth
Pressure for supplying water: 2 kg/cm$^2$
Viscosity of supplying water: $1.02e^{-10}$ kgs/mm$^2$ As a result, it is found that as for the conventional radial bearing without the grooves, the pressure receiving area which is shown in black is small and the load capacity is low as shown in FIG. 8A, while as for the radial bearing with the grooves according to the present invention, the pressure receiving area is widened and the load capacity is high as shown in FIG. 8B. Hydraulic pressure generated in the pressure receiving area is 136.3 kg/mm$^2$ in the conventional radial bearing without the grooves, while the hydraulic pressure is 333.8 kg/mm$^2$ in the radial bearing with the grooves according to the present invention. It is confirmed that in comparison to the conventional radial bearing without the grooves, the pressure within the pressure receiving area is increased approximately 2.4 times in the radial bearing with the grooves according to the present invention.

It should be noted that although the above embodiment is the bearing of the oil cooling type screw compressor, the present invention can be applied to a bearing of a liquid cooling type screw compressor with using liquid other than oil as a cooling medium.

I claim:

1. A radial fluid bearing comprising:
    a bearing element defining axial and circumferential directions, the bearing element having a pressure receiving surface including a pressure receiving area opposing a supported element producing a radial load to be supported by the fluid bearing, wherein the pressure receiving area is provided at a circumferential portion of the pressure receiving surface where the size of a gap with respect to the supported element is smallest, and is not provided at a circumferential portion of the pressure receiving surface where the size of a with respect to the supported element is largest;
    a pressurized viscous liquid at the pressure receiving area to generate a hydraulic pressure for supporting a radial load at the pressure receiving area;
    a groove in the bearing element the groove comprising a plurality of groove portions provided at the periphery of the pressure receiving area so as to enclose the pressure receiving area, which pressure receiving area is entirely inward of any portion of the groove and does not exhibit the groove; and
    a pressurized viscous liquid supply route extending through the bearing and opening at the groove, whereby the groove supplies the pressurized viscous liquid to the pressure receiving area to support the load.

2. The radial fluid bearing according to claim 1, wherein said groove comprises two groove portions in the circumferential direction and two groove portions in the axial direction.

3. The radial fluid bearing according to claim 2, wherein said groove portions in the circumferential direction and said groove portions in the axial direction are continuous to each other at both ends of each groove.

4. A screw compressor comprising:
    a compressor main body;
    a pair of meshing male and female screw rotors in said compressor main body;
    a liquid separator for separating liquid from gas discharged from said compressor main body; and
    a fluid bearing radially supporting each of said screw rotors in said compressor main body, each of the bearings comprising a bearing element defining axial and circumferential directions, the bearing element having a pressure receiving surface including a pressure receiving area opposing a supported element producing a radial load of the screw rotor to be supported by the fluid bearing, wherein the pressure receiving area is provided at a circumferential portion of the pressure receiving surface where the size of a gap with respect to the supported element is smallest, and is not provided at a circumferential portion of the pressure receiving surface where the size of a gap with respect to the supported element is largest, a pressurized viscous liquid at the pressure receiving area to generate a hydraulic pressure for supporting a radial load at the pressure receiving area, a groove in the bearing element the groove comprising a plurality of groove portions provided at the periphery of the pressure receiving area so as to enclose the pressure receiving area, which pressure receiving area is entirely inward of any portion of the groove and does not exhibit the groove, and a viscous liquid supply route extending through the bearing and opening at the groove, whereby the groove supplies said pressurized viscous liquid to the pressure receiving area to support the radial load of the screw rotor.

5. The screw compressor according to claim 4, further comprising:
    a liquid pump for increasing fluid pressure of the separated liquid, whereby the separated liquid provided to the groove to support the radial load of the screw rotor is a pressurized liquid.

* * * * *